United States Patent [19]

Pohl et al.

[11] Patent Number: 4,725,659
[45] Date of Patent: Feb. 16, 1988

[54] NOVEL ROOM TEMPERATURE VULCANIZABLE POLYDIORGANOSILOXANE COMPOSITIONS

[75] Inventors: Eric R. Pohl, Tarrytown; Enrico J. Pepe, Amawalk, both of N.Y.

[73] Assignee: Union Carbide Corporation, Danbury, Conn.

[21] Appl. No.: 927,383

[22] Filed: Nov. 6, 1986

Related U.S. Application Data

[63] Continuation-in-part of Ser. No. 748,357, Jun. 24, 1985, Pat. No. 4,659,798.

[51] Int. Cl.$^4$ .............................................. C08G 77/06
[52] U.S. Cl. ........................................ 528/17; 528/18; 528/21; 528/33; 528/38; 524/859; 524/860
[58] Field of Search ...................... 528/17, 18, 21, 38, 528/33; 524/859, 860

[56] References Cited

U.S. PATENT DOCUMENTS

| | | |
|---|---|---|
| 3,280,072 | 10/1966 | Frankland . |
| 3,560,442 | 2/1971 | Golitz et al. . |
| 3,621,047 | 11/1971 | Golitz et al. . |
| 3,627,800 | 12/1971 | Owen . |
| 3,796,686 | 3/1974 | Golitz et al. . |
| 3,856,756 | 12/1974 | Wagner et al. . |
| 4,448,694 | 5/1984 | Plueddemann . |
| 4,659,798 | 4/1987 | Pohl et al. ............................ 528/33 |

OTHER PUBLICATIONS

Pohl, E. R., "Kinetics and Mechanisms of Acid- and Base-Catalyzed Hydrolysis of Alkyltrialkoxysilanes in Aqueous Solution," Proc. 38th Ann. Tech. Conf., Reinforced Plastics/Composite Inst., S.P.I., Sect. 4-B (1983).

*Primary Examiner*—Melvyn I. Marquis
*Attorney, Agent, or Firm*—Steven H. Flynn

[57] ABSTRACT

Novel room temperature vulcanizable polydiorganosiloxane compositions comprising an $\alpha,\omega$-dihydroxypolydiorganosiloxane and a poly (alkoxysilylalkyl)amine. These compositions are neutral cure, exhibit excellent shelf life stability, possess a practically controllable cure rate and upon curing produce elastomers which have good adhesion to building materials and which possess good weatherability.

10 Claims, No Drawings

NOVEL ROOM TEMPERATURE VULCANIZABLE POLYDIORGANOSILOXANE COMPOSITIONS

This application is a continuation-in-part of U.S. Ser. No. 748,357, filed June 24, 1985, now U.S. Pat. No. 4,659,798.

FIELD OF THE INVENTION

This invention relates to novel room temperature, moisture-curable, storage-stable compositions. More particularly this invention relates to sealant compositions comprising an α,ω-dihydroxypolydiorganosiloxane and a poly-(alkoxysilylalkyl)amine which has at least one amino group or one ring containing a silicon to nitrogen bond.

BACKGROUND OF THE INVENTION

Room temperature, moisture-curable compositions based on α,ω-dihydroxypolydiorganosiloxanes and cross-linkers are known to be useful for the preparation of elastomeric polymers, particularly elastomeric polymers useful in coating, caulking and sealing materials. A desirable property of these compositions is a practically controllable cure rate, i.e. the compositions should cure rapidly enough to become tack-free without undue delay but slowly enough to allow for a reasonable working ("tooling") period.

U.S. Pat. No. 3,280,072 describes the use of mono-aminoalkylalkoxysilanes as cross-linkers in combination with α,ω-dihydroxypolydiorganosiloxanes to produce compositions which upon exposure to moisture cure to form elastomeric polymers. However, the use of certain of these mono-aminoalkylalkoxysilanes, e.g., aminopropyltriethoxysilane, can result in compositions with unacceptably slow cure rates, e.g., requiring seven days or more to vulcanize.

To increase the cure rate of compositions containing α,ω-dihydroxypolydiorganosiloxanes, U.S. Pat. Nos. 3,560,442, 3,621,047 and 3,796,686 propose that the cross-linkers utilized in such compositions should be mono-, bis- or tris-aminoalkyltrialkoxysilanes with a methylene or substituted methylene bridge between the amino and silyl groupings.

In "Kinetics and Mechanisms of Acid- and Base-Catalyzed Hydrolysis of Alkyltrialkoxysilanes in Aqueous Solutions", E. R. Pohl, PROC. 38th ANN. TECH. CONF., REINFORCED PLASTICS/COMPOSITE INST., S.P.I., SECT 4-B (1983), E. R. Pohl disclosed that substitution of a methyl group for a larger alkyl group as the alkyl moiety of alkyltrialkoxysilanes increased the rate of hydrolysis of the alkoxy groups of alkyltrialkoxysilanes. Since hydrolysis is presumably involved in the curing process of the compositions described in the above-mentioned patents, E. R. Pohl's results are essentially consistent with the results obtained in these patents.

Applicants have discovered, however, that use of the cross linkers described in U.S. Pat. Nos. 3,560,442, 3,621,047 and 3,796,686 in α,ω-dihydroxypoly-diorganosiloxane compositions can result in compositions that possess unacceptably fast cure rates, e.g., some of these compositions cure in less than one minute. Such cure rates do not provide for an adequate period for working of the composition.

Accordingly, it is an object of the present invention to provide novel room temperature moisture-curable α,ω-dihydroxypolydiorganosiloxane compositions which possess a practically controllable cure rate, exhibit excellent shelf life stability and, upon curing, produce elastomers which have good adhesion to building materials and which possess good weatherability.

It is another object of the present invention to provide novel poly(alkoxysilylalkyl)amines useful as cross-linkers in α,ω-dihydroxypolydiorganosiloxane compositions.

DESCRIPTION OF THE INVENTION

This invention relates to a room temperature moisture-curable and storage stable α,ω-dihydroxypolydiorganosiloxane composition comprising (i) an α,ω-dihydroxypolydiorganosiloxane comprising a chain of recurring $Z_2SiO$ units, wherein each Z is a substituted or unsubstituted monovalent hydrocarbon group, end-blocked with silicon-bonded hydroxyl groups; and (ii) a poly(alkoxysilylalkyl)amine of the formula:

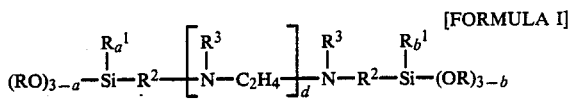

[FORMULA I]

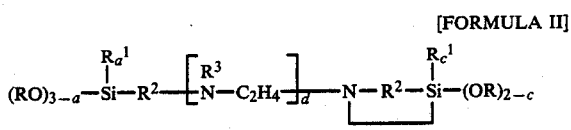

[FORMULA II]

wherein
R is $C_1$–$C_4$ alkyl;
$R^1$ is hydrogen, $C_1$–$C_6$ alkyl or $C_6$–$C_{12}$ aryl;
$R^2$ is $C_3$–$C_8$ alkylene, $C_6$–$C_{12}$ arylene or $C_7$–$C_{14}$ alkarylene;
$R^3$ is hydrogen, $C_1$–$C_6$ alkyl,
$C_6$–$C_{12}$ aryl or

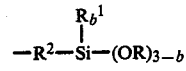

wherein R, $R^1$ and $R^2$ are as defined above;
a and b are 0, 1 or 2; c is 0 or 1; and d is 1 or 2.

For the purposes of the specification and the claims the symbols in Formulas I and II above can have the same or different meanings within each formula.

The α,ω-dihydroxypolydiorganosiloxanes useful in this invention have viscosities ranging from about 10 to about 100,000 centistokes at room temperature, preferably from about 10,000 to about 80,000 centistokes at room temperature. These α,ω-dihydroxypolydiorganosiloxanes can be homopolymers or copolymers in which Z is a monovalent hydrocarbon radical, such as methyl, ethyl, propyl, phenyl or vinyl radical, or a substituted monovalent hydrocarbon radical, such as chlorophenyl, trifluoropropyl or cyanopropyl radical. Preferably Z is methyl but small amounts, i.e., up to about two mole percent, of various other groups, such as ethyl, propyl, phenyl, vinyl, 3,3,3-trifluoropropyl and cyanoethyl, can be substituted for the methyls in the preferred embodiment of this invention.

Preferred poly-(alkoxysilylalkyl)amines useful in this invention are those wherein $R^1$ is $C_1$–$C_4$ alkyl; $R^3$ is hydrogen, methyl or ethyl; and $R^2$ is $C_3$–$C_8$ alkylene, particularly when d is 1. Most preferred poly-(alkoxysilylalkyl)amines are those wherein R is methyl or ethyl; $R^1$ is $C_1$–$C_4$ alkyl; $R^3$ is hydrogen or methyl; $R^2$ is propylene; a and b are 0 or 1; and d is 1.

Illustrative of the poly-(alkoxysilylalkyl)amines which can be used in this invention are the following:

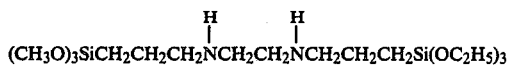

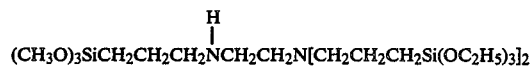

The poly-(alkoxysilylalkyl)amines represented by Formula I above are known compositions of matter [see, e.g., U.S. Pat. No. 2,832,754]-and can be produced by the known process of reacting a chloro-substituted alkyltrialkoxysilane with an amino-substituted alkyltrialkoxysilane. The poly-(alkoxysilylalkyl)amines represented by Formula II above are novel compositions of matter which form a part of the present invention and which can be produced by any suitable process. By way of illustration, the poly-(alkoxysilylalkyl)amines of Formula II can be produced by heating the poly-(alkoxysilylalkyl)amines of Formula I at a temperature of from about 90° to about 400° C., optionally in the presence of an acid catalyst such as benzoic acid or ammonium chloride and optionally in the presence of a non-protic solvent such as a xylene, at atmospheric, superatmospheric or sub-atmospheric pressure, to produce the amines of Formula II and an alcohol (ROH) by-product.

The amount of poly-(alkoxysilylalkyl)amine employed in the compositions of this invention can vary depending, among other factors, on the desired rate of cross linking and on the poly-(alkoxysilylalkyl)amine employed. In general, the amount of poly-(alkoxysilylalkyl)amine employed can be from about 0.1 percent to about 50 percent by weight based on the weight of the $\alpha,\omega$-dihydroxypolydiorganosiloxane. Preferably, the amount of the poly-(alkoxysilylalkyl)amine employed will be from about 0.8% to about 10% and most preferably from about 2% to about 8% by weight based on the weight of the $\alpha,\omega$-dihydroxypolydiorganosiloxane.

The compositions of this invention can be produced by mixing the two components, namely the $\alpha,\omega$-dihydroxypolydiorganosiloxane and the poly-(alkoxysilylalkyl)amine, at room temperature or elevated temperatures up to the boiling point of the lowest boiling component, preferably between about 20° C. to about 100° C., in a dry environment (moisture free). The mixing can be conducted at atmospheric, superatmospheric or subatmospheric pressures.

The compositions of this invention vulcanize or cure into a cross-linked, three-dimensional network upon exposure to moisture without splitting off acids or amines. The curing of the compositions of this invention produce crosslinked silicone elastomeric polymers and non-corrosive, low odor, neutral, low molecular weight alcohols.

The cure rate of the compositions of this invention is dependent on atmospheric temperature, relative humidity, the presence or absence of a silanol condensation catalyst, and the like, but, in general, the compositions of this invention will cure to a tack-free state in a relatively short period of time. Preferably, the compositions should not cure to a tack-free state in less than about 15 minutes to allow for a practical working ("tooling") time. As a practical matter, it is preferable to allow the compositions of this invention to continue curing beyond the period of time required to a achieve a tack-free elastomer. This is desirable to assure that the elastomer will be fully cured, i.e., that the reaction of the siloxanes with the moisture and with each other is complete. The elastomers formed from the compositions of this invention will generally be fully cured in less than seven days.

It is generally preferred to employ a catalyst to facilitate the vulcanization. Any silanol condensation catalyst may be employed, for example, alkyl titanates, organosilicon titanates, metal salts of carboxylic acids such as stannous octoate or dibutyltindilaurate, amine salts such as dibutylamine-2-ethyl-hexoanate, or other conventional acidic or basic catalysts. The catalyst can be added during or after the preparation of the composition and is used in an amount sufficient to cure the composition upon exposure to moisture, for example from about 25 to about 500 parts by weight per million parts by weight of the composition.

The compositions of this invention can also be modified by incorporating therein any of the conventional elastomer fillers, e.g., reinforcing fillers, such as fumed silicas, silica aerogels and precipitated silicas of high surface area. Nonreinforcing fillers can also be used, for example, coarse silicas, such as diatomaceous earth, crushed quartz or metallic oxides, such as titania, ferric oxide, zinc oxide or talc. In addition fibrous fillers such as asbestos or glass fibers or filaments may be used. In all cases, it is desirable that the filler be substantially dry before being admixed with the polymers. The fillers are generally employed to upgrade physical properties and to modify the flow characteristics of the uncured polymer. The fillers can comprise as much as 70% by weight of the total weight of the composition provided that no more than 30% by weight of the total weight of the composition are reinforcing fillers. Preferably the fillers will comprise from 0% to about 40% by weight of the total weight of the composition provided that only from 0% to 20% by weight of the total weight of the composition are reinforcing fillers. The compositions of this invention may also contain modifiers such as resinous siloxane modifiers as plasticizers (e.g., trimethylsilyl-capped polydimethylsiloxane) to make the cured polymers more dough-like and more resilient, as well as additives such as pigments, UV stabilizers, oxidation inhibitors and the like or dielectric substances such as graphite and carbon black. It is immaterial whether these fillers, modifiers or additives and the like are added to the sealant compositions of this invention during or after their preparation as described herein. However, it is most preferable that they be added under substantially anhydrous conditions.

It will be understood that the compositions of this invention can comprise mixtures of the poly-(alkoxysilylalkyl)amines defined by this invention as well as combinations of the poly-(alkoxysilylalkyl)amines of this invention with a minor amount other silicon-based cross-linkers or chain extenders (e.g., methyltrimethoxysilane) to selectively alter the inherent properties of the composition such as, e.g., cure rate, flexibility and elongation of the cured polymer, and the like.

The compositions of this invention should be stored in the absence of moisture or viscosity buildup or gellation can occur. Compositions of this invention have excellent storage stability (usually greater than six months) when stored in the absence of moisture.

The vulcanized polymers produced from the compositions of this invention are useful in coating applications and in caulking and sealing applications on buildings, airplanes, bathrooms fixtures, automotive equipment or wherever elastomeric polymers are employed. Another desirable feature of these compositions is their ability to be applied to moist or wet surfaces and be cured into a cross-linked elastomer without deleterious effects, which cured product becomes tack-free within a relatively short period of time. Moreover, the cured compositions of this invention strongly adhere alone or with the aid of a primer to a wide variety of substrates such as glass, porcelain, wood, metals, polymeric materials and the like making them especially suited for many types of caulking, adhesive or laminating application.

The following Examples are provided to illustrate the present invention. The abbreviations and symbols used in the Examples have the following meanings:

| ABBREVIATION OR SYMBOL | MEANING |
|---|---|
| °C. | degree Centigrade |
| °F. | degree Fahrenheit |
| m. | meter |
| mm. | millimeter |
| ml. | milliliter |
| g. | gram |
| in. | inch |
| min. | minute |
| sec. | second |
| psi | pounds per square inch |
| ppi | pounds per inch |
| pli | pounds per length inch |
| rpm | revolutions per minute |
| cstk | centistoke |
| % | percent |

EXAMPLE I

A. Preparation of Sealant Composition

Into a 500 ml container were added α,ω-dihydroxypolydimethylsiloxane with a viscosity of 20,000 centistokes at 25° C. (100 g., 0.002 moles); and 3,3,14,14-tetramethoxy-7,10-diaza-2,15-dioxa-3,14-disilahexadecane 1.53 g., 0.004 moles). The materials were mixed by hand for 3-5 minutes. Trapped air was removed from the composition by placing the container in a vacuum desicator at 1 mm Hg pressure for 10-20 minutes.

B. Testing Procedure

The following procedure was then utilized to test the composition prepared as described above, in compliance with Federal Specification TT-S-001543A and ASTM C 920-79.

The sealant composition was charged to the center of a 0.1 mm. ×8 in. ×8 in. piece of water soluble paper. A 6 in. ×6 in. ×0.125 in. metal frame was placed on the paper followed by another sheet of paper. The sealant composition was uniformly distributed inside the frame by pressing down on the top sheet of paper with a metal plate. The preparation of the plaques from the sealant composition was accomplished in approximately 5-8 minutes. The plaque of sealant composition was placed in a Forma Scientific Environmental Chamber that was set at 22° C. (77° F.) and 50 percent relative humidity. The composition formed a tack-free silicone elastomer between 4 and 16 hours. After 10 days, the paper was etched from the plaques using distilled water. The plaques were then allowed to equilibrate in the environmental chamber for an additional 2 days.

Hardness of the plaques was measured using a Shore 2A Durometer. Six measurements were randomly taken across the surface of ¼ in. thick cured sealant composition sample. The average value was recorded.

Six tensile specimens and six tear specimens were prepared from the cured sealant composition plaques using the ASTM D 412-80 DIE C. The tear specimens were notched using a Wallace Cutter. The specimens were stretched until they broke using the Monsanto Tensometer. The crosshead speed was 20 in./min.

The results of the above described evaluation procedures are set forth immediately below.

| | |
|---|---|
| Hardness, Shore 2A | 8 |
| Tensile (psi) | 23 |
| % Elongation | 121 |

As shown below, direct comparisons were made between a composition of the present invention and comparative compositions of the prior art to demonstrate the superior cure rate of the composition of this invention.

COMPARATIVE EXAMPLE A

Triethyl amine (133 g., 1.31 moles) and allyl amine (10.0 g., 0.175 mole) were charged to a 500 ml., three neck, round bottom flask that was equipped with condenser, thermometer, dropping funnel and a magnetic stirring bar. Chloromethyltrimethoxysilane (60.0 g., 0.350 mole) was added dropwise at room temperature. The mixture was refluxed for 12 hours and then cooled to room temperature. The mixture was filtered to remove the triethyl ammonium chloride and the crude product was distilled at 2.2 mm Hg at 77° C. to produce N,N-bis-(triethoxysilylmethyl)allylamine. The N,N-bis-(triethoxysilylmethyl)allylamine so produced was found to be greater than 95% pure by gas chromatography.

N,N-bis-(trimethoxysilylmethyl)allylamine produced as described above (1.33 g., 0.004 mole), α,ω-dihydroxypolydimethylsiloxane of 20,000 cstk at 25° C. (100 g., 0.002 mole) were mixed in a 500 ml. container using a wooden stick. The mixture gelled within 1 minute. Due to the very short gellation time, the plaques required for further testing could not be prepared.

COMPARATIVE EXAMPLE B

Chloromethyltrimethoxysilane (50.0 g., 0.29 mole) and ammonia (98.6 g., 5.80 mole) were charged to a 300 ml. stainless steel pressure vessel. The mixture was heated to 100° C. at 800 psi pressure for 8 hours and then cooled. The mixture was filtered. The crude product was distilled at 60° C. and 0.2 mm Hg pressure to produce N,N-bis-(trimethoxysilylmethyl)amine. The N,N-bis-(trimethoxysilylmethyl)amine so produced (3.0 g., 0.01 mole) was found to be greater than 95% pure by gas chromatography.

(1) N,N-bis-(trimethoxysilylmethyl)amine produced as described above (1.16 g., 0.004 mole), α,ω-dihydroxypolydimethysiloxane of 20,000 cstk at 25° C. (100 g., 0.002 mole) and dibutyltindilaurate (0.01 g.) were mixed in a 500 ml. container using a wooden stick. The mixture gelled within 1 minute.

(2) N,N-bis-(trimethoxysilylmethyl)amine produced as described above (0.58 g., 0.002 mole) and α,ω-dihydroxypolydimethylsiloxane of 20,000 cstk at 25° C. (50.0 g., 0.001 mole) were mixed in a 500 ml. container using a wooden stick. The mixture gelled within 1 minute. Due to the very short gellation time, the plaques required for further testing could not be prepared.

The results of this comparative testing demonstrate the improved cure rates possessed by the compositions of the present invention which allow for the proper application of the elastomers. In contrast, the prior art compositions, even absent a catalyst, possessed unacceptably rapid cure rates.

What is claimed is:

1. A room temperature, moisture-curable polydiorganosiloxane composition comprising
    (i) an α, ω-dihydroxypolydiorganosiloxane comprising a chain of recurring $Z_2SiO$ units wherein each Z is a substituted or unsubstituted monovalent hydrocarbon group; and
    (ii) a poly-(alkoxysilylalkyl)amine of the formula:

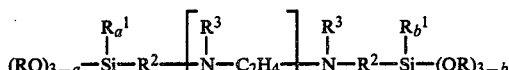

or

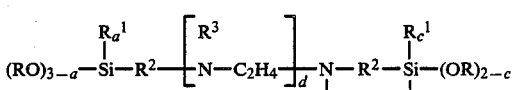

wherein
R is $C_1$–$C_4$ alkyl;
$R^1$ is hydrogen, $C_1$–$C_6$ alkyl or $C_6$–$C_{12}$ aryl;
$R^2$ is $C_3$–$C_8$ alkylene, $C_6$–$C_{12}$ arylene, or $C_7$–$C_{14}$ alkarylene;
$R^3$ is hydrogen, $C_1$–$C_6$ alkyl, $C_6$–$C_{12}$ aryl or

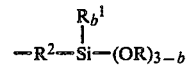

wherein R, $R^1$ and $R^2$ are as defined above;
a and b are 0, 1 or 2;
c is 0 or 1; and
d is 1 or 2

2. A composition as recited in claim 1 wherein d is 1.

3. A composition as recited in claim 1 wherein the poly-(alkoxysilylalkyl)amine is present in an amount ranging from 0.8% to 10% by weight based on the weight of the α,ω-dihydroxypolydiorganosiloxane.

4. A composition as recited in claim 1 wherein the poly-(alkoxysilylalkyl)amine is present in an amount ranging from 2% to 8% by weight based on the weight of the α,ω-dihydroxypolydiorganosiloxane.

5. A composition as recited in claim 1 wherein the α,ω-dihydroxypolydiorganosiloxane is α,ω-dihydroxypolydimethylsiloxane.

6. A composition as recited in claim 1 wherein $R^1$ is $C_1$–$C_4$ alkyl; $R^3$ is hydrogen, methyl or ethyl; and $R^2$ is $C_3$–$C_8$ alkylene.

7. A composition as recited in claim 6, wherein R is methyl or ethyl; $R^3$ is hydrogen or methyl; $R^2$ is propylene; a and b are 0 or 1; and d is 1.

8. A composition as recited in claim 1 admixed with a filler.

9. A composition as recited in claim 1 admixed with a silanol condensation catalyst in an amount sufficient to cure the composition upon exposure to moisture.

10. A composition as recited in claim 9 admixed with a filler.

* * * * *